United States Patent
Yamane (10) Patent No.: US 9,602,002 B2
(45) Date of Patent: Mar. 21, 2017

(54) SWITCHING POWER SUPPLY DEVICE

(71) Applicant: FUJI ELECTRIC CO., LTD., Kawasaki-shi (JP)

(72) Inventor: Hiroki Yamane, Matsumoto (JP)

(73) Assignee: FUJI ELECTRIC CO., LTD., Kawasaki-Shi (JP)

( * ) Notice: Subject to any disclaimer, the term of this patent is extended or adjusted under 35 U.S.C. 154(b) by 0 days.

(21) Appl. No.: 14/942,720

(22) Filed: Nov. 16, 2015

(65) Prior Publication Data
US 2016/0164415 A1  Jun. 9, 2016

(30) Foreign Application Priority Data
Dec. 8, 2014 (JP) ................................. 2014-248141

(51) Int. Cl.
*H02M 3/158* (2006.01)
*H02M 1/15* (2006.01)
*H02M 1/08* (2006.01)
*H02M 1/00* (2006.01)

(52) U.S. Cl.
CPC ............. *H02M 3/158* (2013.01); *H02M 1/15* (2013.01); *H02M 1/08* (2013.01); *H02M 2001/0025* (2013.01)

(58) Field of Classification Search
CPC ...... H02M 3/155; H02M 3/156; H02M 3/158; H02M 3/157; H02M 3/1563; H02M 1/15; H02M 1/08; H02M 2001/0025; G05F 1/562; G05F 1/565; G05F 1/56; G05F 1/575
USPC ....... 323/222, 271, 276, 282, 283, 284, 285, 323/351
See application file for complete search history.

(56) References Cited

U.S. PATENT DOCUMENTS

| | | | | |
|---|---|---|---|---|
| 6,933,706 B2 * | 8/2005 | Shih | ........................ | H02M 1/38 323/222 |
| 6,949,961 B2 * | 9/2005 | Robb | ..................... | H02H 9/004 257/341 |
| 6,956,361 B1 * | 10/2005 | Mozipo | ............... | H02M 3/1588 323/283 |
| 7,075,275 B2 * | 7/2006 | Motomori | ........... | H02M 3/1588 315/283 |
| 7,772,811 B1 * | 8/2010 | Jain | ....................... | H02M 3/157 323/224 |
| 2006/0103332 A1 | 5/2006 | Motomori et al. | | |
| 2010/0237841 A1 * | 9/2010 | Matsuo | ............... | H02M 3/1588 323/282 |
| 2010/0270989 A1 * | 10/2010 | Sasaki | ................... | H02M 3/157 323/282 |

(Continued)

FOREIGN PATENT DOCUMENTS

| | | |
|---|---|---|
| JP | 2004-040856 A | 2/2004 |
| JP | 2006-149065 A | 6/2006 |

*Primary Examiner* — Adolf Berhane
(74) *Attorney, Agent, or Firm* — Rabin & Berdo, P.C.

(57) ABSTRACT

A switching power supply device includes a slope compensation circuit configured to start slope compensation for suppressing subharmonic oscillation in accordance with a timing signal from an oscillation circuit. The oscillation circuit is provided with a first circuit, which generates a signal of a fundamental oscillation frequency, and a second circuit, which applies logic processing to the signal of the fundamental oscillation frequency to form the timing signal. Thus, it is possible to provide a switching power supply device in which a variation in a start timing of slope compensation can be suppressed.

14 Claims, 6 Drawing Sheets

(56) References Cited

U.S. PATENT DOCUMENTS

| | | | | |
|---|---|---|---|---|
| 2011/0316508 A1* | 12/2011 | Cheng | .................... | H02M 1/14 323/282 |
| 2013/0207629 A1* | 8/2013 | Engelhardt | ........... | H02M 3/156 323/282 |
| 2014/0002043 A1* | 1/2014 | Li | ......................... | H02M 3/156 323/282 |
| 2014/0159686 A1* | 6/2014 | Lee | ...................... | H02M 3/156 323/282 |
| 2014/0266110 A1* | 9/2014 | Yuan | ................... | H02M 3/156 323/282 |
| 2014/0292300 A1* | 10/2014 | Yan | ...................... | H02M 3/157 323/288 |
| 2014/0333270 A1* | 11/2014 | Young | ...................... | G05F 1/12 323/234 |
| 2015/0357914 A1* | 12/2015 | Ozanoglu | ........... | H02M 3/1582 323/271 |
| 2016/0065065 A1* | 3/2016 | Noebauer | ........... | H02M 3/1588 323/271 |

\* cited by examiner

SWITCHING POWER SUPPLY DEVICE

CROSS-REFERENCE TO RELATED APPLICATION

This application is based on, and claims priority to, Japanese Patent Application No. 2014-248141, filed on Dec. 8, 2014, the contents of which are entirely incorporated herein by reference for all purposes.

BACKGROUND

1. Technical Field

The present disclosure relates to a current mode control type switching power supply device. In particular, it relates to a switching power supply device, which performs slope compensation in order to suppress subharmonic oscillation.

2. Description of Related Art

When a switching element is operated with an ON duty cycle (ON-time ratio) of 50% or more in a current mode control type switching power supply device, a phenomenon may occur in which a switching current fluctuates at a lower frequency than at a switching operation frequency (phenomenon where the ON duty cycle is not stable but swings). This phenomenon is referred to as subharmonic oscillation.

The subharmonic oscillation brings about disadvantages such as an increase of ripples, occurrence of noise, etc. Therefore, a switching power supply device in which slope compensation is performed to suppress subharmonic oscillation has been proposed, for example, in JP-A-2004-040856 and JP-A-2006-149065.

There are two types of slope compensation, that is, a first type in which a downslope signal is added to a signal in a feedback signal form (signal indicating an output voltage error) and a second type in which an upslope signal is added to a current detection signal (signal corresponding to a current flowing into a switching element).

A start point (start timing) of the slope compensation is generally set by use of a signal of an internal oscillator and applied to a region in which the switching ON duty cycle is more than 50%. The slope compensation is applied from the start point to suppress subharmonic oscillation so that stable operation can be performed.

Fluctuation in the region where the slope compensation starts affects the accuracy in making a determination as to whether an output current is an overcurrent or not (overcurrent determination accuracy). This is described as follows.

When a signal which has been subjected to slope compensation is used to determine the overcurrent, a reference value for making the determination is the sum of an actual current determination value (determination value for a detected current) and a slope compensation value at the time of the determination. To determine (ascertain) the slope compensation value in this case is as follows:

1) When the design of a switching power supply device is determined, the relationship between an ON-time ratio (ON duty cycle) and the heaviness of a load (output current value) is fixed.
2) The ON-time ratio for determining the overcurrent is determined.
3) The slope compensation value is determined in response to the ON-time ratio being determined. The slope compensation value is set when a reference value (overcurrent determination reference value) for determining the overcurrent is determined.

When the start timing of the slope compensation deviates, a difference between the slope compensation value determined in the paragraph 3) and the actual slope compensation value is generated. Accordingly, overcurrent determination accuracy decreases when using the overcurrent determination reference value.

A slope compensation circuit in the switching power supply device is described in JP-A-2004-040856. This slope compensation circuit is configured with an amplification circuit capable of offsetting a predetermined voltage. The terminal voltage of a capacitor, charged by a current from a constant current source, is input to the amplification circuit to obtain a slope compensation signal, which rises at a predetermined timing. The amplification circuit outputs a triangular wave signal as a slope compensation signal. The triangular wave signal increases in accord with a predetermined gradient from the instant the terminal voltage of the capacitor is coincident with the offset voltage. The slope compensation signal is added to a current detection signal indicating the magnitude of a current flowing into a switching element and is used for PWM control of the switching element.

In the slope compensation circuit of JP-A-2004-040856, there is a concern that a start timing of slope compensation may vary due to: a variation in the current value of the constant current source charging the capacitor, a capacitance value variation in the capacitor, a voltage value variation in a reference voltage source determining the offset voltage of the amplification circuit, etc. The variation in the start timing of slope compensation causes the overcurrent determination accuracy to decrease.

On the other hand, JP-A-2006-149065 describes a circuit that charges/discharges a plurality of capacitors, and determines a rising timing of a slope compensation signal (i.e. a start timing of slope compensation) based on a comparison among charging voltages of the respective capacitors.

Also in this circuit, there is a concern that the start timing of slope compensation may vary due to: a capacitance value variation in each capacitor, a current value variation in a constant current source charging the respective capacitors, an offset variation of a comparator comparing the charging voltages of the capacitors, etc. The variation in the start timing of slope compensation causes the overcurrent determination accuracy to decrease.

SUMMARY

Therefore, the present disclosure may, for example, provide a switching power supply device in which a variation in a start timing of slope compensation can be suppressed.

The present disclosure may provide a current mode control type switching power supply device including: a compensation circuit that performs signal compensation by generating a signal to suppress subharmonic oscillation in the switching power supply device; and an oscillation circuit including a first circuit that generates a signal having a fundamental oscillation frequency, and a second circuit that applies logic processing to the signal having the fundamental oscillation frequency to set a switching cycle of the switching power supply device corresponding to the fundamental oscillation frequency, and a start time of the signal compensation, the signal compensation being performed by the compensation circuit in response to the start time being set by the oscillation circuit.

In one implementation, second circuit may apply frequency division to signal having the fundamental oscillation frequency in the logic processing.

In one implementation, the second circuit may generate a signal having a switching frequency by applying ½ frequency division to the signal having the fundamental oscillation frequency in the logic processing.

In one implementation, the switching power supply device may include a switching element and be configured to add the signal to suppress subharmonic oscillation to a current detection signal corresponding to a current flowing into the switching element. The signal to suppress subharmonic oscillation may have an increasing slope.

In another implementation, the switching power supply device may be configured to add the signal to suppress subharmonic oscillation to a signal indicating an output voltage error and an overcurrent determination reference value. The signal to suppress subharmonic oscillation may have a decreasing slope.

In one implementation, the switching power supply device may include the switching element, and the second circuit may set a maximum value of an ON-time ratio of a switching element as the switching cycle of the switching power supply device.

The switching power supply device according to the present disclosure may be of one type selected from a step-down type, a step-up type, a step-up and step-down type and a flyback type.

According to the present disclosure, the first circuit may generate a signal having a fundamental oscillation frequency and the second circuit may applies logic processing to the signal having the fundamental oscillation frequency to set a start time of the signal compensation. Accordingly, an error of the start time formed thus is smaller than that in the case where a start time is formed based on comparison of an analog signal with a reference voltage of a reference voltage source or with another analog signal. Thus, it is possible to, for example, improve determination accuracy when an overcurrent is determined using a signal which has been subjected to signal compensation.

DETAILED DESCRIPTION

Figure 1:
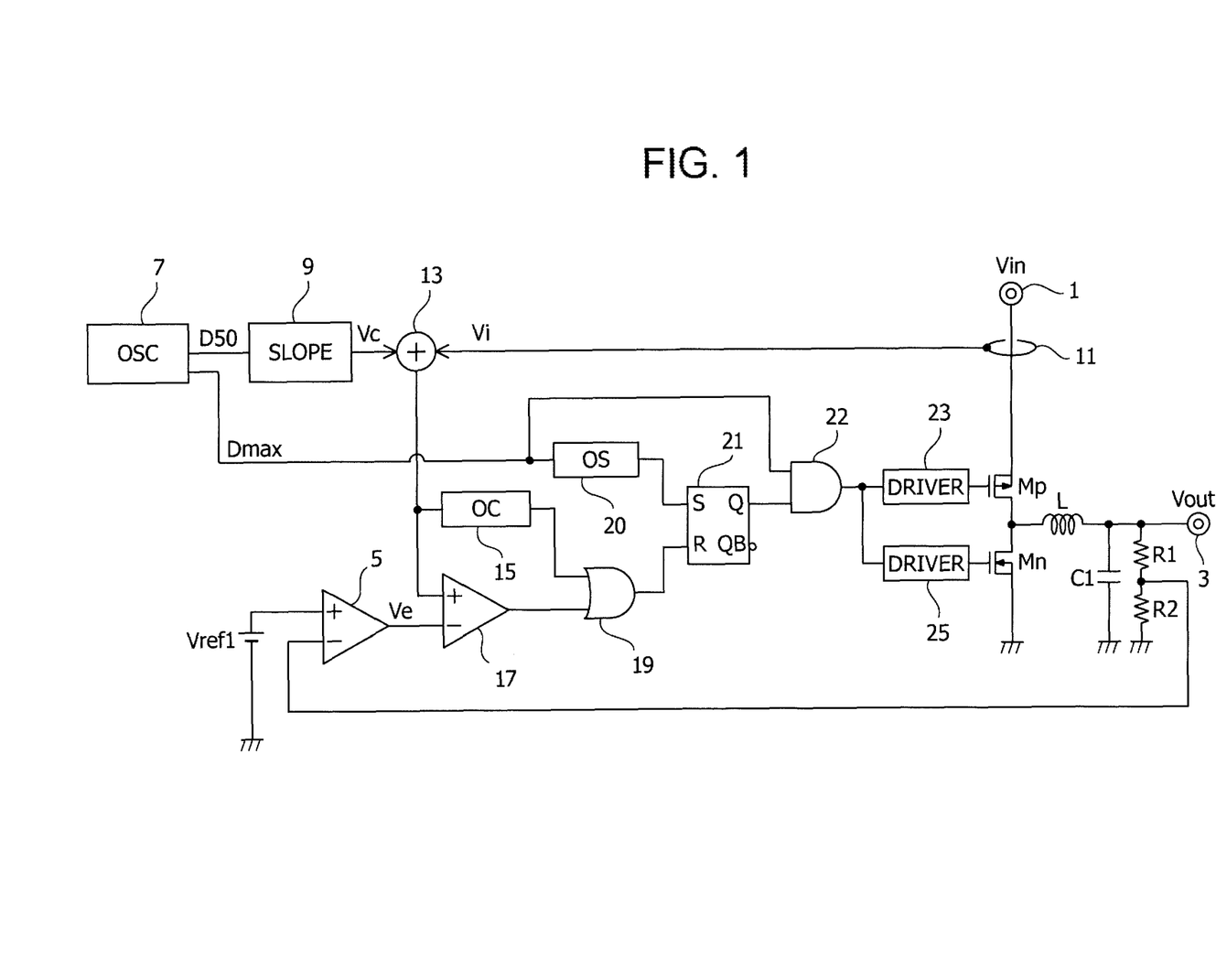
FIG. 1 is a block diagram showing an implementation of a switching power supply device according to the present disclosure.

FIG. 1 is a block diagram showing an embodiment of a current mode control-type switching power supply device according to the present disclosure.

In FIG. 1, a P channel MOS transistor Mp and an N channel MOS transistor Mn are connected in series between an input terminal 1 and the ground. A voltage Vin is input to the input terminal 1. Incidentally, the transistor Mp (or Mn) will be referred to as switching element Mp (or Mn).

The two switching elements Mp and Mn alternately turn ON/OFF so that a voltage, in which the input voltage Vin has been intermitted, can be generated at a connection point between the two switching elements Mp and Mn. After the intermitted voltage has been smoothed by a smoothing filter including an inductor L and a capacitor C1, the smoothed voltage is output as a voltage Vout from an output terminal 3.

The output voltage Vout divided by resistors R1 and R2 is input to an error amplifier 5. The error amplifier 5 amplifies a difference between the divided output voltage Vout and a predetermined reference voltage Vref1, and outputs an error signal Ve corresponding to the difference. The error signal Ve will be hereinafter referred to as feedback signal.

An oscillation circuit 7 generates a D50 signal and a Dmax signal which will be described later. A slope compensation circuit 9 is triggered by the D50 signal to generate a slope compensation signal Vc which will be described later. A current detection circuit 11 detects a current flowing into the switching element Mp, i.e., a current flowing into the inductor L, and outputs a voltage signal Vi (current detection signal) corresponding to the detected current signal. An adder circuit 13 adds the slope compensation signal Vc output from the slope compensation circuit 9 to the current detection signal Vi output from the current detection circuit 11, and outputs a signal (Vc+Vi) as its arithmetic result.

An overcurrent detection circuit 15 compares the output signal (Vc+Vi) of the adder circuit 13 with a predetermined overcurrent determination reference value. When the former is larger than the latter, the overcurrent detection circuit 15 determines that the output current has become an overcurrent, and changes the output signal to a high (H) level. In addition, a PWM comparator 17 compares the output signal (Vc+Vi) of the adder circuit 13 with the output signal Ve of the error amplifier 5. When the former exceeds the latter, the PWM comparator 17 changes the output signal to an H level.

An output terminal of the overcurrent detection circuit 15 is connected to one input terminal of an OR circuit 19. In addition, an output terminal of the PWM comparator 17 is connected to the other input terminal of the OR circuit 19.

An RS flip-flop 21 has a set terminal S, a reset terminal R and an output terminal Q. The set terminal S of the RS flip-flop 21 is connected to an output terminal of a one-shot circuit (monostable multivibrator) 20 triggered by the Dmax signal of the oscillation circuit 7. The reset terminal R of the RS flip-flop 21 is connected to an output terminal of the OR circuit 19. The output terminal Q of the RS flip-flop 21 is connected to one input terminal of an AND circuit 22. An output terminal of the AND circuit 22 is connected to gate electrodes of the switching elements Mp and Mn through driver circuits 23 and 25, respectively.

The Dmax signal is input to the other input terminal of the AND circuit 22. The Dmax signal defines a maximum ON-time ratio (maximum ON duty cycle) of the switching element Mp. That is, the output of the AND circuit 22 is a signal for controlling ON/OFF of the switching element Mp. The maximum value of a period in which the output of the AND circuit 22 is in an H level, i.e. a period in which the switching element Mp is ON is a period in which the Dmax signal is in an H level. In this manner, the maximum ON-time ratio is defined. Even when the output of the RS flip-flop 21 is in an H level in a period exceeding the maximum ON-time ratio, the switching element Mp turns OFF.

Figure 2:
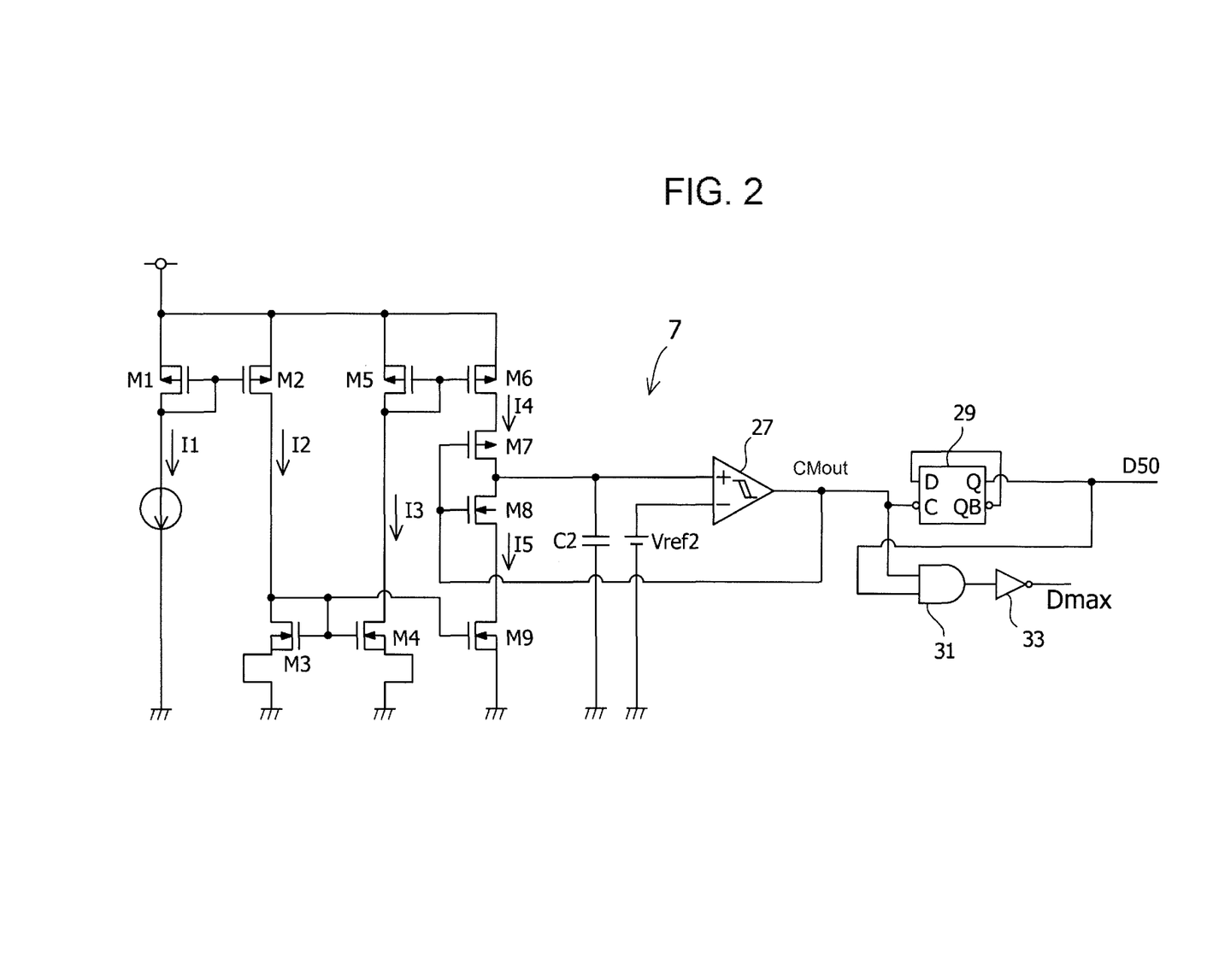
FIG. 2 is a circuit diagram showing a configuration example of an oscillation circuit.

FIG. 2 shows a configuration example of the oscillation circuit 7.

In the oscillation circuit 7, P channel MOS transistors M1 and M2, N channel MOS transistors M3 and M4, P channel MOS transistors M5 and M6, and N channel MOS transistors M3 and M9 form current mirror circuits respectively.

The transistors M2 and M3 are connected in series. The transistors M4 and M5 are also connected in series. A P channel MOS transistor M7 and an N channel MOS transistor M8 connected in series are interposed between the transistors M6 and M9.

A drain terminal of the P channel MOS transistor M1 is connected to a constant current source which draws a constant current I1 from the transistor M1.

One end of a capacitor C2 is connected to a series connection point between the transistors M7 and M8. The other end of the capacitor C2 is grounded. A non-inverting input terminal of a hysteresis comparator 27 is connected to the one end of the capacitor C2. An inverting input terminal of the hysteresis comparator 27 is connected to a reference voltage source which generates a reference voltage Vref2. Although the reference voltage Vref2 is indicated as one reference voltage in FIG. 2, the reference voltage Vref2 actually includes two reference voltages Vref2(H) and Vref2(L) (Vref2(H)>Vref2(L)).

An output terminal of the hysteresis comparator 27 is connected to a clock input terminal C of a negative edge trigger type D flip-flop 29 and one input terminal of an AND circuit 31. A data terminal D of the flip-flop 29 is connected to an inverted output terminal QB of the flip-flop 29. An output terminal Q of the flip-flop 29 is connected to the other input terminal of the AND circuit 31. An output terminal of the AND circuit 31 is connected to an input terminal of an inverter 33.

In the oscillation circuit 7, a current I2 flowing from the transistor M2 is equal to or proportional to the constant current I1 flowing from the transistor M1. In addition, a current I3 flowing into the transistor M4 and a current I5 flowing into the transistor M9 are equal to or proportional to the current I2. Further, a current I4 flowing from the transistor M6 is equal to or proportional to the current I3.

The hysteresis comparator 27 outputs a low (L) level signal to turn ON the transistor M7 and turn OFF the transistor M8 when the terminal voltage of the capacitor C2 is not higher than the reference voltage Vref2. As a result, the capacitor C2 is charged by the current I4 through the transistor M7. When the terminal voltage of the capacitor C2 increases to the reference voltage Vref2(H) due to the charging, the output signal of the hysteresis comparator 27 turns to an H level. In accordance with this, the transistor M7 turns OFF and the transistor M8 turns ON. Accordingly, the capacitor C2 is discharged by the current I5. When the terminal voltage of the capacitor C2 decreases to the reference voltage Vref2(L) due to the discharging, the output signal of the hysteresis comparator 27 turns to an L level. In accordance with this, the transistor M7 turns ON and the transistor M8 turns OFF. Accordingly, the capacitor C2 is charged by the current I4. Charging and discharging are repeated hereafter in the aforementioned manner. As a result, the terminal voltage of the capacitor C2 changes to a triangular waveform between Vref2(H) and Vref2(L), as shown in FIG. 3.

Assume here that the ratio of the charging current to the discharging current (the ratio of the charging current I4 to the discharging current I5) in the capacitor C2 is 1:4. In this case, the ratio of the charging time to the discharging time in the capacitor C2 becomes 4:1.

The fundamental oscillation frequency of the oscillation circuit 7 is determined based on the values of the charging and discharging currents of the capacitor C2. That is, the fundamental oscillation frequency of the oscillation circuit 7 is a frequency of the output signal of the hysteresis comparator 27 controlling ON/OFF of the transistors M7 and M8.

Figure 3:
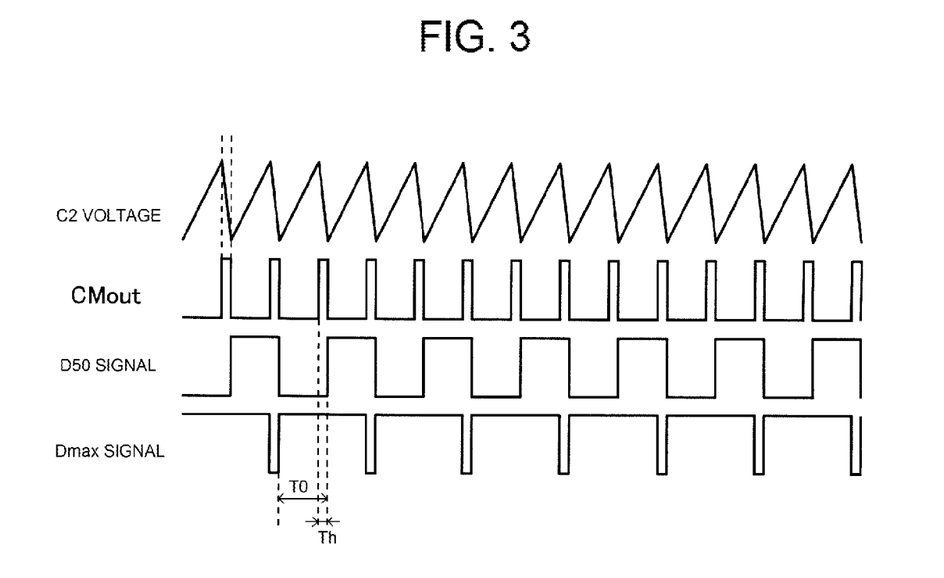
FIG. 3 is a timing chart for explaining an operation of the oscillation circuit.

The output signal CMout of the hysteresis comparator 27 is shown in FIG. 3. The signal CMout is in an L level in the period in which the capacitor C2 is being charged. The signal CMout is in an H level in the period in which the capacitor C2 is being discharged. The signal CMout is input to the clock input terminal C of the D flip-flop 29. The D50 signal, shown in FIG. 3, has a frequency obtained by applying ½ frequency division to the frequency of the signal CMout is output from the output terminal Q of the D flip-flop 29. The D50 signal is a rectangular wave signal whose duty cycle (time ratio) is 50% (in this implementation of the disclosure, the "duty cycle of a signal" means a ratio of a period in which the signal is in an H level in a cycle to the cycle of the signal). For example, the frequency (fundamental oscillation frequency) of the signal CMout is set at 130 kHz. In this case, the frequency of the D50 signal becomes 65 kHz.

The AND circuit 31 logically synthesizes the D50 signal and the signal CMout with each other. Accordingly, a Dmax signal as shown in FIG. 3 is output from the inverter 33 connected to the AND circuit 31. The duty cycle of the Dmax signal can be set desirably depending on the setting of the duty cycle of the signal CMout. When, for example, the duty cycle of the signal CMout is set at 20%, the Dmax signal having a duty cycle of 90% can be generated.

That is, in FIG. 3, assume that the cycle of the rectangular wave signal CMout is T0 and the H level time of the signal CMout in the cycle T0 is Th. When the duty cycle of the signal CMout is 20% in this case, the relation Th/T0=0.2 is established.

On the other hand, the cycle of the Dmax signal is 2×T0. The time in which the Dmax signal is in an L level is equal to the H level time Th of the signal CMout. Accordingly, the duty cycle of the Dmax signal is (2×T0−Th)/(2×T0)=1−0.1=0.9=90%

In FIG. 1, the D50 signal output from the oscillation circuit 7 triggers the slope compensation circuit 9 when the D50 signal rises. As a result, the slope compensation circuit 9 generates a triangular wave slope compensation signal (upslope signal) Vc which increases with a predetermined gradient from the instant when the slope compensation circuit 9 is triggered.

On the other hand, the Dmax signal output from the oscillation circuit 7 triggers the one-shot circuit 20 when the Dmax signal rises. At a timing when the one-shot circuit 20 is triggered, the one-shot circuit 20 outputs a short pulse signal to the RS flip-flop 21 to thereby set the RS flip-flop 21. In accordance with this, the switching element Mp turns ON. The current detection signal Vi output from the current detection circuit 11 indicates the magnitude of the ON current of the switching element Mp.

When the value of a combined signal (Vc+Vi) output from the adder circuit 13 reaches the value of the feedback signal Ve output from the error amplifier 5, the output signal of the PWM comparator 17 turns to an H level. Accordingly, the RS flip-flop 21 is reset through the OR circuit 19.

In addition, the combined signal (Vc+Vi) is also input to the overcurrent detection circuit 15 and compared with an overcurrent determination reference value. When determination is made that the combined signal (Vc+Vi) is an overcurrent, the output level of the overcurrent detection circuit 15 turns to an H level. The H level signal resets the RS flip-flop 21 through the OR circuit 19.

When the RS flip-flop 21 is reset, a PWM signal turns to an L (low) level. Accordingly, the switching element Mp turns OFF. As a result, the value of the current detection signal Vi becomes zero. When the current signal becomes zero, the combined signal (Vc+Vi) becomes a signal in which only the slope compensation signal is reflected, and the reset signal of the RS flip-flop 21 is released.

In addition, a logical product signal of the Q output of the RS flip-flop 21 and the Dmax signal is output by the AND circuit 22 and serves as an input to the driver circuits 23 and 25. Accordingly, even in the case where the reset signal does not enter the RS flip-flop 21 for a long period due to a heavy load etc., the switching element Mp turns OFF as soon as the Dmax signal turns to the L level. Accordingly, the duty cycle of the Dmax signal becomes the maximum ON-time ratio of the switching element, as described above.

The aforementioned operation is repeated every generation cycle of the Dmax signal and a predetermined output voltage Vout is output from the output terminal 3.

Figure 4:
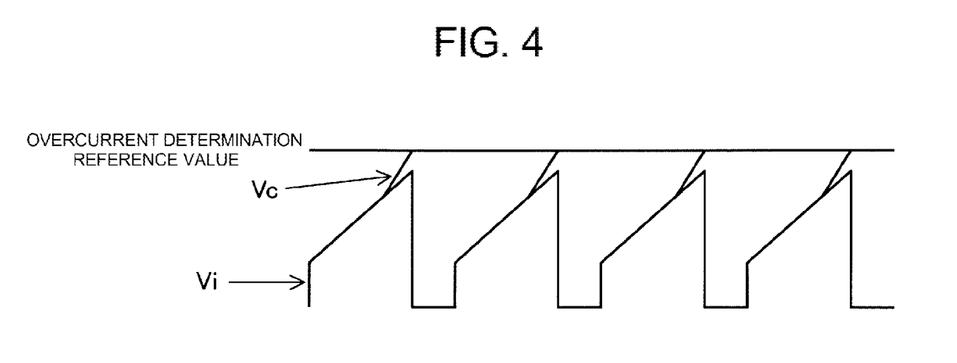
FIG. 4 is an explanatory view showing the relation between a combined signal in which a slope compensation signal is added to a current signal and an overcurrent determination reference value.

FIG. 4 shows the relation among the current detection signal Vi, the slope compensation signal Vc added to the current signal Vi, and the overcurrent determination reference value set for the combined signal (Vc+Vi). When the combined signal (Vc+Vi) is larger than the overcurrent determination reference value, the output signal of the overcurrent detection circuit 15 turns to an H level and the RS flip-flop 21 is reset. Accordingly, the switching element Mp is turned OFF.

As described above, according to the switching power supply device according to the implementation, the D flip-flop 29 generates the D50 signal by applying ½ frequency division to the frequency (fundamental oscillation frequency) of the output signal CMout of the hysteresis comparator 27.

The falling of the D50 signal and the rising of the Dmax signal occur at the same timing. The cycle of the D50 signal and the Dmax signal is equal to the switching cycle.

As described above, when the switching element is operated in an ON duty cycle (ON-time ratio) of 50% or more in the current mode control type switching power supply device, subharmonic oscillation occurs. The D50 signal triggers the slope compensation circuit 9 so that slope compensation can start at a timing corresponding to the ON duty cycle of 50%. Accordingly, the subharmonic oscillation can be suppressed by the slope compensation performed by the slope compensation circuit 9.

Moreover, the D50 signal is formed by applying ½ frequency division to the frequency (fundamental oscillation frequency) of the signal CMout as described above. Accordingly, the timing corresponding to 50% of the switching cycle can be indicated more accurately than the D50 signal in a comparative example which will be described below. In accordance with this, a variation in the start timing of the slope compensation also becomes smaller. That is, overcurrent detection accuracy is consequently improved because the accuracy of the rising timing of the slope compensation signal Vc shown in FIG. 4 is increased.

Comparative Example

Figure 5:
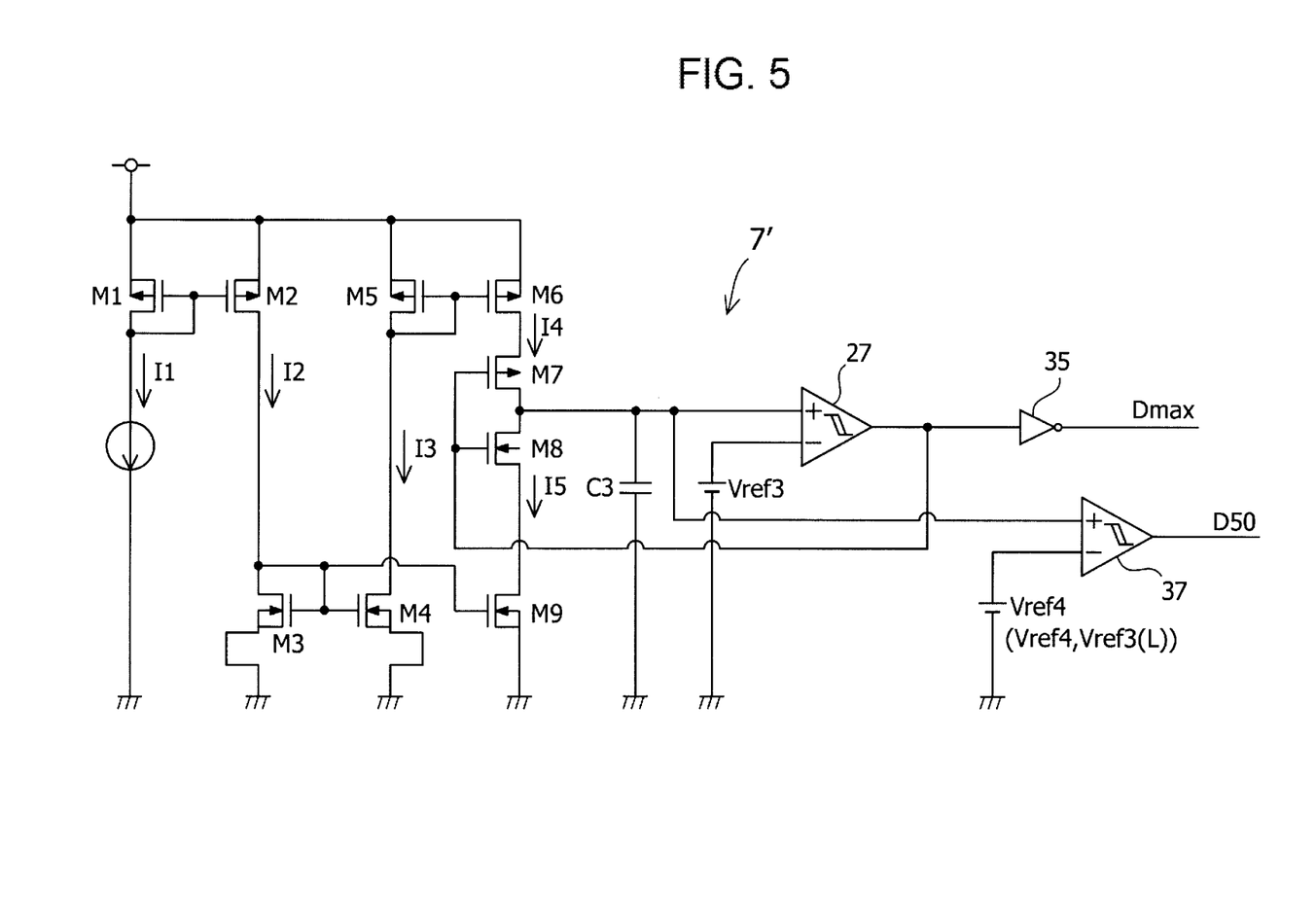
FIG. 5 is a circuit diagram showing the configuration of an oscillation circuit according to a comparative example.

FIG. 5 shows the configuration of an oscillation circuit 7' according to the comparative example. The oscillation circuit 7' is different from the oscillation circuit 7 shown in FIG. 2 in the following aspects.

That is, the oscillation circuit 7' is different from the oscillation circuit 7 in that the capacitor C2 and the reference voltage Vref2 in FIG. 2 are replaced by a capacitor C3 and a reference voltage Vref3, the output signal of the hysteresis comparator 27 is inverted by an inverter 35 to form a Dmax signal, and the terminal voltage of the capacitor C3 is compared by a hysteresis comparator 37 and a signal indicating the comparison result is output as a D50 signal.

The reference voltage Vref3 actually includes two reference voltages Vref3(H) and Vref3(L) (Vref3(H)>Vref3(L)), similarly to the reference voltage Vref2. A reference voltage Vref4 also includes two reference voltages Vref4 and Vref3 (L) (Vref4>Vref3(L)). Incidentally, a reference voltage source generating the reference voltage Vref3(L) is connected to the hysteresis comparators 27 and 37 in common.

Figure 6:
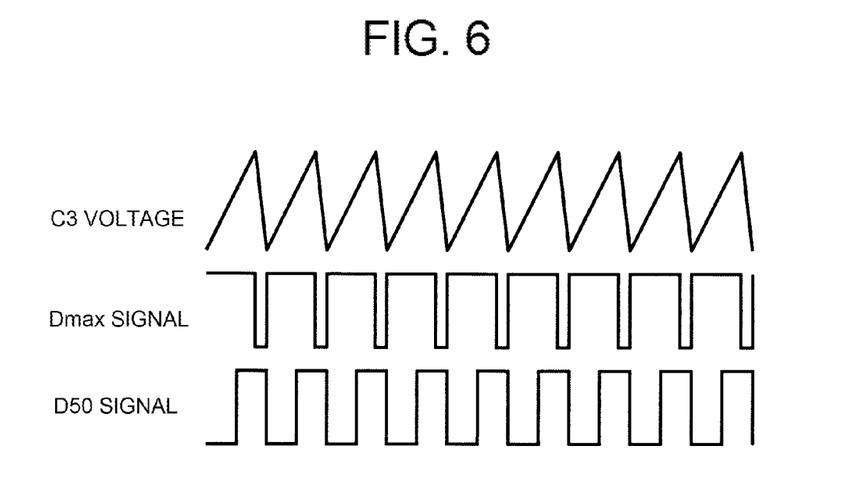
FIG. 6 is a timing chart for explaining an operation of the oscillation circuit according to the comparative example.

FIG. 6 shows the terminal voltage of the capacitor C3 which changes to a triangular wave shape and the Dmax signal which is an inverted signal of the output signal of the hysteresis comparator 27. When the switching frequency is made the same, the frequency of the output signal of the hysteresis comparator 27 in the oscillation circuit 7 in FIG. 2 becomes twice as high as that in the oscillation circuit 7'. Accordingly, the frequency of the Dmax signal in the oscillation circuit 7' is consequently equal to the frequency of the Dmax signal in FIG. 3 formed by applying ½ frequency division to the frequency of the output signal of the hysteresis comparator 27 in FIG. 2.

The duty cycle of the Dmax signal in the oscillation circuit 7' is determined based on the current ratio between the transistors M6 and M9. When, for example, the current ratio between the transistors M6 and M9 is set at 1:1, the Dmax signal has a duty cycle of 50%. In addition, when the current ratio is set at 1:4, the duty cycle of the Dmax signal becomes substantially 80%.

When the current ratio is 1:1, the Dmax signal is used to trigger the slope compensation circuit 9 so that slope compensation can be started at a timing corresponding to the ON duty cycle of 50%. However, when the current ratio is not 1:1, it is necessary to form a D50 signal in order to start slope compensation at the timing corresponding to the ON duty cycle of 50%. The hysteresis comparator 37 and the reference voltage Vref4 are provided for forming the D50 signal.

The D50 signal is in an H level in a period between the instant when the charging voltage of the capacitor C3 charged by the current I4 exceeds the reference voltage Vref4 and the instant when the charging voltage of the capacitor C3 discharged by the current I5 reaches the reference voltage Vref3(L). Here, the reference voltage Vref3(L) also serves as a reference voltage which is input to the hysteresis comparator 27 and which determines a time to suspend discharging the capacitor C3 (so that the falling timing of the D50 signal can be made the same as the rising timing of the Dmax signal, i.e. the start timing of the switching cycle). Accordingly, the D50 signal is in an H level in the sum of a charging period of the capacitor C3 after the charging voltage exceeds the reference voltage Vref4 and the whole discharging period of the capacitor C3.

Accordingly, the current ratio between the transistors M6 and M9 is set at 1:4, that is, the ratio of the charging period of the capacitor C3 to the discharging period of the capacitor C3 is set at 80%:20%. In this case, a voltage ⅝ as large as a difference between the charging and discharging terminal voltages of the capacitor C3 (Vref3(H)−Vref(L)) is added to the reference voltage Vref3(L) and set as the potential of the reference voltage Vref4. Accordingly, a D50 signal (rectangular wave signal) having a duty cycle of 50% can be output from the comparator 37.

However, in the case of such a configuration, the duty cycle of 50% in the D50 signal is determined depending on the reference voltage Vref4. Accordingly, a variation in the reference voltage Vref4 largely affects a variation in the duty cycle of the D50 signal. The variation in the duty cycle of the D50 signal causes deviation of the aforementioned slope compensation start timing.

Figure 7:
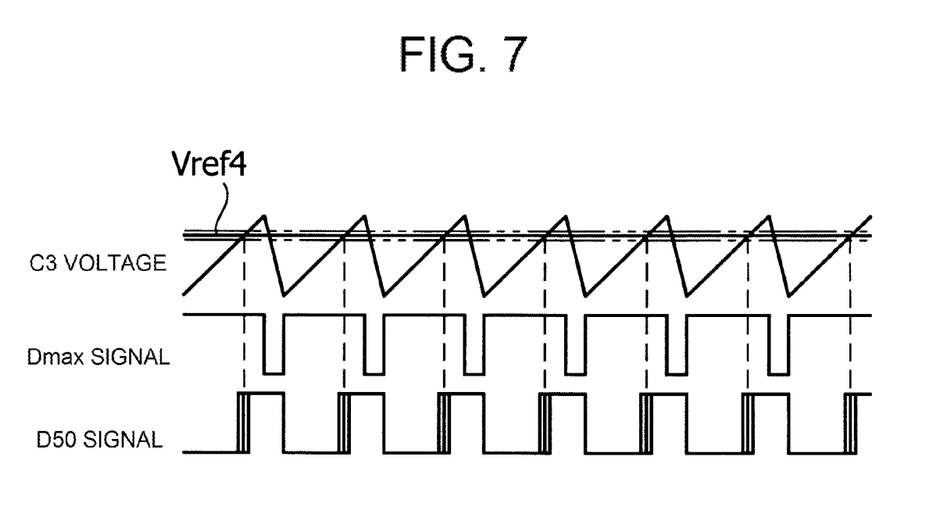
FIG. 7 is a timing chart for explaining a variation in a start point of a D50 signal.

FIG. 7 shows an image of a variation in the D50 signal in the oscillation circuit 7'. As shown in FIG. 7, a variation in the reference voltage Vref4 generates a variation in a start point of an ON-time of the D50 signal. Accordingly, when the D50 signal is used to define a slope compensation start timing, the variation in the start point of the D50 signal directly becomes a variation in the slope compensation start timing (start point).

Figure 8:
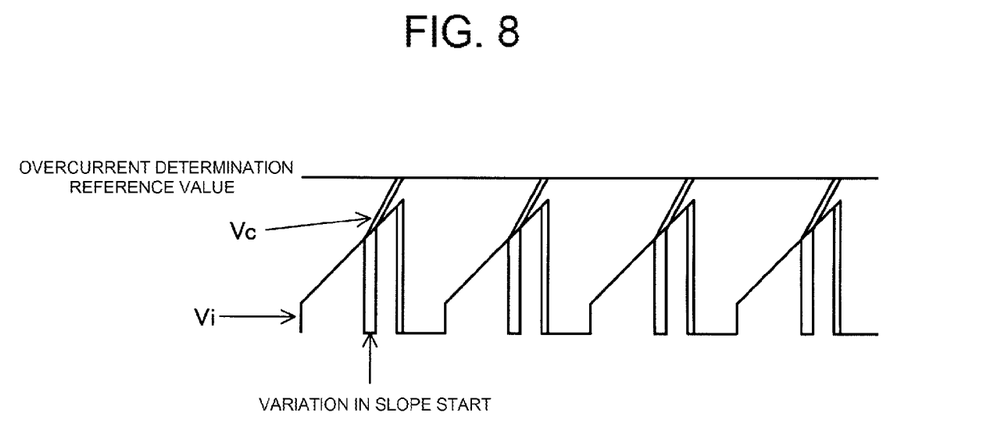
FIG. 8 is an explanatory view showing the relation among a slope compensation signal, a fluctuation mode of a current signal, a combined signal in which the slope compensation signal is added to the current signal, and an overcurrent determination reference value.

FIG. 8 shows the relation among a current detection signal Vi in the case where the oscillation circuit 7' according to the comparative example is used, a slope compensation signal Vc added to the current signal Vi, and an overcurrent determination reference value set for a combined signal (Vc+Vi). When the start point of the D50 signal varies, the start point of the slope compensation signal Vc varies, as shown in FIG. 8. Therefore, the value of the combined signal (Vc+Vi) detected by the overcurrent detection circuit 15 changes and overcurrent detection accuracy decreases.

In the switching power supply device using the oscillation circuit 7' according to the comparative example, the aforementioned problem arises. On the other hand, in the switching power supply device according to the implementation using the oscillation circuit 7 in FIG. 2, the D50 signal is formed without using the reference voltage Vref4 and the comparator 37 shown in FIG. 5, i.e. formed by applying ½ frequency division to the frequency (fundamental oscillation frequency) of the output signal CMout of the hysteresis comparator 27. Accordingly, the variation in the slope compensation start timing can be suppressed so that the overcurrent detection accuracy can be improved.

The present disclosure is not limited to the aforementioned implementation but may include any other implementations without departing from the spirit and scope of the present disclosure.

That is, in the implementation, the oscillation circuit 7 shown in FIG. 2 is applied to a step-down type switching power supply device. However, the present disclosure may also include an implementation in which the oscillation circuit 7 is applied to a step-up type switching power supply device, a step-up and step-down type switching power supply device, a flyback type switching power supply device, or the like.

In addition, although the implementation has a configuration in which an upslope signal is added to a current detection signal, the present disclosure may be also applied to a configuration in which a downslope signal is added to a signal in a feedback signal form (signal indicating an output voltage error) and an overcurrent determination reference value.

Further, in the oscillation circuit 7 according to the implementation, a D50 signal rising at a timing corresponding to an ON duty cycle of 50% is formed as a timing signal for generating a slope compensation signal. The oscillation circuit 7 may be configured to form the timing signal rising from a region which is larger than the ON duty cycle of 50% or from a region which is smaller than the ON duty cycle of 50%.

In this case, the frequency (fundamental oscillation frequency) of the output signal CMout of the hysteresis comparator 27 is selected in accordance with its purpose, and a logical circuit for processing an output signal of the D flip-flop 29 and implementing the aforementioned timing signal is provided.

What is claimed is:

1. A current mode control switching power supply device comprising:
   a compensation circuit that performs signal compensation by generating a signal to suppress subharmonic oscillation in the switching power supply device; and
   an oscillation circuit including
      a first circuit that generates a signal having a fundamental oscillation frequency, and
      a second circuit that applies logic processing to the signal having the fundamental oscillation frequency to set
         a switching cycle of the switching power supply device corresponding to the fundamental oscillation frequency, and
         a start time of the signal compensation, the signal compensation being performed by the compensation circuit in response to the start time being set by the oscillation circuit.

2. The switching power supply device of claim 1, wherein the second circuit applies frequency division to the signal having the fundamental oscillation frequency in the logic processing.

3. The switching power supply device of claim 2, wherein the second circuit generates a signal having a switching frequency by applying ½ frequency division to the signal having the fundamental oscillation frequency in the logic processing.

4. The switching power supply device of claim 1, further comprising:
   a switching element, wherein
   the switching power supply device is configured to add the signal to suppress subharmonic oscillation to a current detection signal,
   the signal to suppress subharmonic oscillation has an increasing slope, and
   the current detection signal corresponds to a current flowing into the switching element.

5. The switching power supply device of claim 1, wherein the switching power supply device is configured to add the signal to suppress subharmonic oscillation to a signal indicating an output voltage error and an overcurrent determination reference value, and
   the signal to suppress subharmonic oscillation has a decreasing slope.

6. The switching power supply device of claim 1, further comprising:
   a switching element, wherein
   the second circuit sets a maximum value of an ON-time ratio of the switching element as the switching cycle of the switching power supply device.

7. The switching power supply device of claim 1, wherein the switching power supply device is of a type selected from the group consisting of
a step-down type,
a step-up type,
a step-up and step-down type, and
a flyback type.

8. The switching power supply device of claim 3, wherein the first circuit comprises
a hysteresis comparator that generates the signal having the fundamental frequency, and
the second circuit comprises
a D flip-flop that generates the signal having the switching frequency.

9. The switching power supply device of claim 3, wherein the start time set by the oscillation circuit corresponds to
a rising edge of the signal having the switching frequency.

10. The switching power supply device of claim 1, further comprising:
a switching element; and
an adder circuit that adds the signal to suppress subharmonic oscillation to a current detection signal, wherein
the signal to suppress subharmonic oscillation has an increasing slope, and
the current detection signal corresponds to a current flowing into the switching element.

11. The switching power supply device of claim 10, further comprising:
an overcurrent detection circuit that generates an overcurrent determination signal by comparing a sum of the signal to suppress subharmonic oscillation and the current detection signal with an overcurrent determination reference value.

12. A current mode control switching power supply device comprising:
a switching element;
a current detection circuit configured to generate a current detection signal having an amplitude and corresponding to a current input to the switching element;
an oscillation circuit including
a first circuit configured to generate a signal having a fundamental oscillation frequency, and
a second circuit configured to generate a signal having a switching frequency by applying frequency division to the signal having the fundamental oscillation frequency; and
a compensation circuit configured to compensate the amplitude of the current detection signal in response to receiving the signal having the switching frequency.

13. The switching power supply device of claim 12, wherein
the compensation circuit is configured to compensate the amplitude of the current detection signal by generating a signal to suppress subharmonic oscillation in the switching power supply device in response to receiving a rising edge of the signal having the switching frequency.

14. The switching power supply device of claim 13, wherein
the signal to suppress subharmonic oscillation is a triangular wave signal that increases in slope according to a predetermined gradient.

* * * * *